J. SIBILLE.
LUG FOR TRACTORS.
APPLICATION FILED MAR. 14, 1917.
1,252,960.
Patented Jan. 8, 1918.
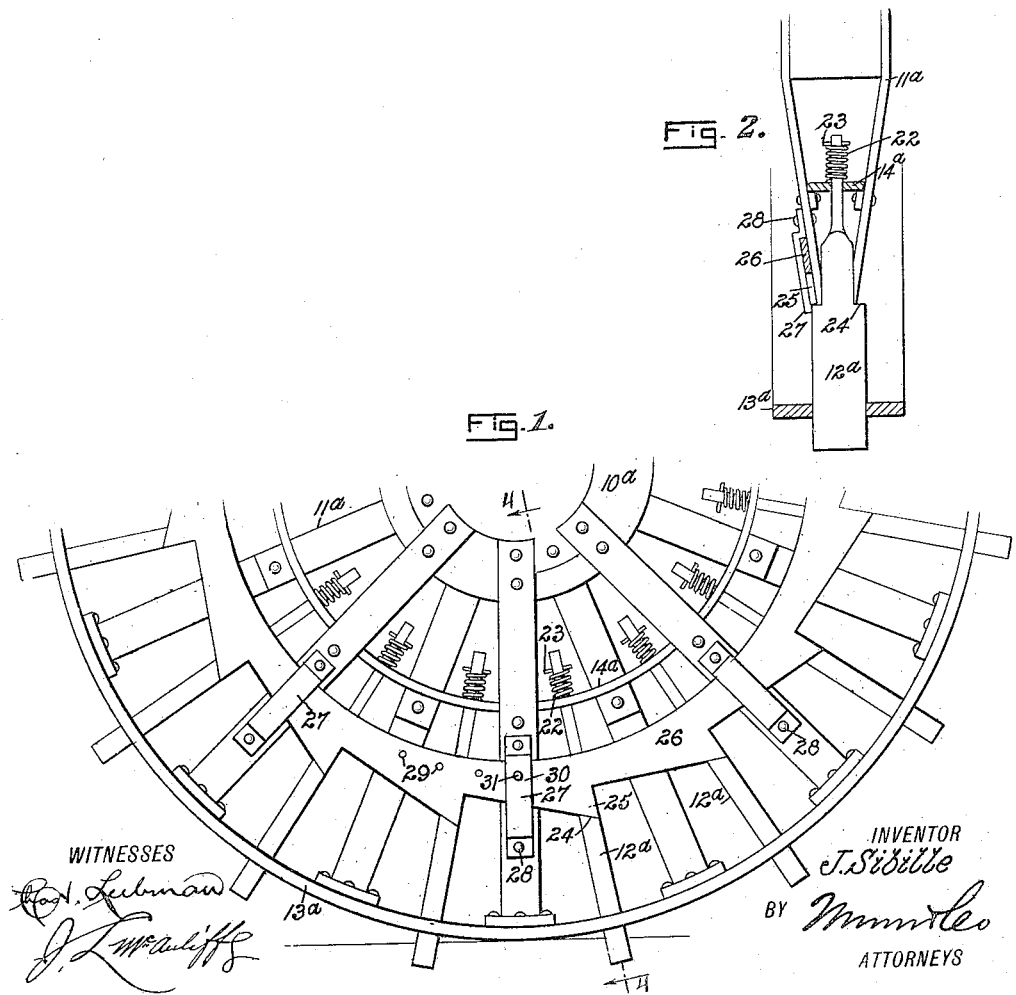

UNITED STATES PATENT OFFICE.

JOHN SIBILLE, OF GRAND COTEAU, LOUISIANA.

LUG FOR TRACTORS.

1,252,960. Specification of Letters Patent. Patented Jan. 8, 1918.

Application filed March 14, 1917. Serial No. 154,695.

*To all whom it may concern:*

Be it known that I, JOHN SIBILLE, a citizen of the United States, and a resident of Grand Coteau, in the parish of St. Landry and State of Louisiana. (post-office address Arnaudville, in the said parish and State,) have invented a new and Improved Lug for Tractors, of which the following is a full, clear, and exact description.

My invention relates to the wheels of tractors and particularly to the lugs for giving the wheel the necessary traction on the ground.

The prime object of the invention is to provide a tractor wheel equipped with lugs adapted to be adjusted for hard or soft roads with facility, whereby to save time in changing the character of the wheel.

In carrying out my invention use is made of separate tractor lugs mounted on the wheel to project more or less beyond the periphery of the wheel or to be retracted whereby to present little or no projection beyond the tread of the wheel.

The invention will be particularly explained in the specific description following.

Reference is to be had to the accompanying drawings forming a part of this specification in which similar reference characters indicate corresponding parts in all the views.

Figure 1 is a side elevation of a portion of a wheel embodying my invention;

Fig. 2 is a cross section on the line 4—4, Fig. 1.

The illustrated wheel includes the hub $10^a$, spokes $11^a$, and rim $13^a$, all of which may be suitably constructed and arranged. Each lug $12^a$ is movable radially through the rim $13^a$ and at the rear end, the lug has guided movement through a ring $14^a$ on the wheel. On each spoke is a coil spring 22 abutting at its forward end against the ring $14^a$ and at its inner end against any fixed member such as a pin $23^a$ on the lug.

In order to simultaneously force all the lugs $12^a$ outwardly to project the same beyond the rim $13^a$, I provide a cam wheel 26 having an annular series of cams 25 presenting at the outer sides thereof inclined surfaces engaging shoulders 24 on the lugs $12^a$. The wheel 26 is adapted to be turned in keepers 27 suitably secured to the spokes as by bolts or rivets 28. Thus, a turning of the cam ring 26 through the necessary angle, will force the lugs outwardly against the tension of the springs 22, the extent of projection depending on the extent of movement of the ring 26.

To hold the ring 26 in a given position for maintaining the lugs in the projected or retracted positions, the ring 26 is provided with suitable locking means, there being shown a series of holes 29 in said ring, either of which holes is adapted to be brought into register with the holes 30 in one of the keepers 27 for receiving a locking pin 31.

Having thus described my invention I claim as new, and desire to secure by Letters Patent:

In a tractor wheel, a series of spring-pressed tractor rods movable radially on the wheel to project beyond the rim or to be moved to retracted positions, a cam ring engaging the several lugs and movable on the wheel through an angle to move the lugs against the tension of the springs, to positions to project beyond the wheel rim, a series of radially disposed keepers on said wheel in which the cam ring is permitted guided movement, one of said keepers having a pinhole therein, the cam ring having a series of pin-holes, either of which may be brought into register with the pinhole of the keepers, and a pin adapted to be passed through the registering holes to hold the cam ring against movement.

JOHN SIBILLE.

Copies of this patent may be obtained for five cents each, by addressing the "Commissioner of Patents, Washington, D. C."